US010635219B2

(12) United States Patent
Chou

(10) Patent No.: US 10,635,219 B2
(45) Date of Patent: Apr. 28, 2020

(54) TACTILE SENSOR

(71) Applicant: Industrial Technology Research Institute, Hsinchu (TW)

(72) Inventor: Min-Chieh Chou, Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 16/184,943

(22) Filed: Nov. 8, 2018

(65) Prior Publication Data

US 2019/0212860 A1 Jul. 11, 2019

(30) Foreign Application Priority Data

Jan. 5, 2018 (TW) .............................. 107100430 A

(51) Int. Cl.
*G06F 3/044* (2006.01)
*G06F 3/041* (2006.01)
(Continued)

(52) U.S. Cl.
CPC ............ *G06F 3/0414* (2013.01); *G01L 1/146* (2013.01); *G01L 5/228* (2013.01); *G06F 3/044* (2013.01);
(Continued)

(58) Field of Classification Search
CPC ....... G01L 1/146; G01L 5/228; G06F 3/0414; G06F 3/044
(Continued)

(56) References Cited

U.S. PATENT DOCUMENTS

| 4,526,043 A | 7/1985 | Boie et al. |
| 4,982,611 A | 1/1991 | Lorenz et al. |

(Continued)

FOREIGN PATENT DOCUMENTS

| CN | 103852088 | 6/2014 |
| EP | 2770314 | 8/2014 |

(Continued)

OTHER PUBLICATIONS

Lee et al., "A Flexible Polymer Tactile Sensor: Fabrication and Modular Expandability for Large Area Deployment," Journal of Microelectromechanical Systems, Dec. 2006, pp. 1681-1686.

(Continued)

*Primary Examiner* — Tony O Davis
(74) *Attorney, Agent, or Firm* — JCIPRNET

(57) ABSTRACT

A tactile sensor including an elastic dielectric layer, first ribbon electrodes, and second ribbon electrodes is provided. The elastic dielectric layer has a first surface and a second surface opposite to each other. The first ribbon electrodes are disposed on the first surface. Each of the first ribbon electrodes extends in a first direction and includes first sensing portions serially connected in the first direction. The second ribbon electrodes are disposed on the second surface. Each of the second ribbon electrodes extends in a second direction intersecting the first direction. Each of the first sensing portions has a first extending length in the first direction to cross over N second ribbon electrodes. Each of the first sensing portions has a first edge parallel to the second direction. The first edge is aligned with an edge of one of the second ribbon electrodes. N is a positive integer greater than 1.

18 Claims, 8 Drawing Sheets

(51) Int. Cl.
*G01L 5/22* (2006.01)
*G01L 1/14* (2006.01)

(52) U.S. Cl.
CPC .......... *G06F 3/0445* (2019.05); *G06F 3/0446* (2019.05); *G06F 3/0447* (2019.05)

(58) Field of Classification Search
USPC .......................................... 345/170–178, 156
See application file for complete search history.

(56) References Cited

U.S. PATENT DOCUMENTS

| | | | |
|---|---|---|---|
| 5,553,500 | A | 9/1996 | Grahn et al. |
| 6,341,532 | B1 | 1/2002 | Xu et al. |
| 6,416,533 | B1 | 7/2002 | Gobin et al. |
| 6,622,575 | B1 | 9/2003 | Nagata |
| 6,871,395 | B2 | 3/2005 | Scher et al. |
| 6,955,094 | B1 | 10/2005 | Tarler |
| 7,148,882 | B2 | 12/2006 | Kamrath et al. |
| 7,926,364 | B2 | 4/2011 | Joung |
| 8,250,926 | B2 | 8/2012 | Yang et al. |
| 8,421,311 | B2 | 4/2013 | Chuang et al. |
| 8,725,431 | B2 | 5/2014 | Yamashita |
| 9,222,846 | B2 | 12/2015 | Lim et al. |
| 9,250,143 | B2 | 2/2016 | Harrington et al. |
| 9,310,265 | B2 | 4/2016 | Shimoyama et al. |
| 9,652,696 | B2 | 5/2017 | Won |
| 10,072,998 | B2* | 9/2018 | Chang .................. G01L 9/0058 |
| 2007/0257821 | A1* | 11/2007 | Son ........................ G06F 3/016 341/22 |
| 2008/0007532 | A1 | 1/2008 | Chen |
| 2010/0307900 | A1* | 12/2010 | Choi ..................... H01H 13/85 200/330 |
| 2011/0036181 | A1 | 2/2011 | Fritzsche et al. |
| 2011/0128239 | A1* | 6/2011 | Polyakov ................ G06F 3/016 345/173 |
| 2012/0126959 | A1* | 5/2012 | Zarrabi ................ B06B 1/0688 340/407.1 |
| 2012/0206248 | A1* | 8/2012 | Biggs ...................... G06F 3/016 340/407.2 |
| 2012/0219701 | A1 | 8/2012 | Wu |
| 2013/0044049 | A1* | 2/2013 | Biggs ...................... G06F 3/016 345/156 |
| 2013/0075266 | A1 | 3/2013 | Kim et al. |
| 2013/0207793 | A1* | 8/2013 | Weaber ................. G06F 1/1601 340/407.2 |
| 2014/0076066 | A1 | 3/2014 | Harrington et al. |
| 2016/0033343 | A1* | 2/2016 | Park ........................ G01L 1/205 73/862.046 |
| 2017/0176266 | A1 | 6/2017 | Mathieu et al. |
| 2018/0066636 | A1* | 3/2018 | Khoshkava ............ F03G 7/065 |
| 2018/0224346 | A1 | 8/2018 | Kawaguchi et al. |
| 2019/0212860 | A1* | 7/2019 | Chou ...................... G01L 1/146 |

FOREIGN PATENT DOCUMENTS

| | | |
|---|---|---|
| JP | H085482 | 1/1996 |
| JP | 2009145555 | 7/2009 |
| JP | 2009543030 | 12/2009 |
| JP | 2010122018 | 6/2010 |
| JP | 2012168064 | 9/2012 |
| JP | 2013073618 | 4/2013 |
| JP | 2014115282 | 6/2014 |
| JP | 2016176794 | 10/2016 |
| JP | 2017156126 | 9/2017 |
| JP | 2017181320 | 10/2017 |
| TW | I448935 | 8/2014 |
| TW | I470197 | 1/2015 |
| TW | I574181 | 3/2017 |
| TW | 201714058 | 4/2017 |
| TW | I588712 | 6/2017 |
| TW | 201728883 | 8/2017 |
| WO | 2016132921 | 8/2016 |
| WO | 2017146142 | 8/2017 |

OTHER PUBLICATIONS

Rocha et al., "3 Axis Capacitive Tactile Sensor and Readout Electronics," IEEE ISIE 2006, Jul. 2006, pp. 2767-2772.

Cheng et al., "A Polymer-Based Capacitive Sensing Array for Normal and Shear Force Measurement," Sensors, Nov. 2010, pp. 10211-10225.

Cheng et al., "A flexible capacitive tactile sensing array with floating electrodes," Journal of Micromechanics and Microengineering, Sep. 2009, pp. 1-10.

Lee et al., "Normal and Shear Force Measurement Using a Flexible Polymer Tactile Sensor With Embedded Multiple Capacitors," Journal of Microelectromechanical Systems, Aug. 2008, pp. 934-942.

Viry et al., "Flexible Three-Axial Force Sensor for Soft and Highly Sensitive Artificial Touch," Advanced Materials, Feb. 2014, pp. 2659-2664.

"Notice of Allowance of Taiwan Counterpart Application," dated Jul. 18, 2019, p. 1-p. 4.

Yoji Marutani et al., "Basic Experiment of Partial Solidification of a Thermosetting Resin with an IR Laser", The Review of Laser Engineering, vol. 17, No. 6, Jun. 28, 1989, pp. 425-428.

"Office Action of Japan Counterpart Application", dated Aug. 20, 2019, pp. 1-5.

"Office Action of Japan Counterpart Application", dated Feb. 18, 2020, pp. 1-6.

* cited by examiner

TACTILE SENSOR

CROSS-REFERENCE TO RELATED APPLICATION

This application claims the priority benefit of Taiwan application no. 107100430, filed on Jan. 5, 2018. The entirety of the above-mentioned patent application is hereby incorporated by reference herein and made a part of this specification.

TECHNICAL FIELD

The disclosure relates to a sensor. More particularly, the disclosure relates to a tactile sensor.

BACKGROUND

In recent decades, with rapid progress of artificial intelligence related technologies, many autonomous humanoid robots have been gradually developed. An ideal autonomous humanoid robot is required to be equipped with sufficient sensing ability of the changes of the surrounding environment (including people, work pieces, and other robots and objects), so as to ensure that the actions of the robot are performed safely and correctly. As such, in addition to sensing and determining the magnitude of compression, a tactile sensor is also required to be able to determine the shear force.

The multi-mode tactile sensors that may simultaneously sense the multi-dimensional stresses have been the subject of research for many years. Nevertheless, owing to limitations of the manufacture equipment, most of the tactile sensors can only be fabricated on a plane and can not be fabricated directly on a curved surface. The process of fabricating the tactile sensors on a curved surface is complicated and costly.

SUMMARY

A tactile sensor is provided herein which has a simple structure and may be fabricated on a curved surface.

In an embodiment of the disclosure, a tactile sensor includes an elastic dielectric layer, a plurality of first ribbon electrodes, and a plurality of second ribbon electrodes. The elastic dielectric layer has a first surface and a second surface opposite to each other. The first ribbon electrodes are disposed on the first surface. Each of the first ribbon electrodes extends in a first direction and includes a plurality of first sensing portions serially connected in the first direction. The second ribbon electrodes are disposed on the second surface. Each of the second ribbon electrodes extends in a second direction. The first direction intersects the second direction. Each of the first sensing portions has a first extending length in the first direction to cross over N second ribbon electrodes. Each of the first sensing portions has a first edge parallel to the second direction. The first edge is aligned with an edge of one of the second ribbon electrodes. N is a positive integer greater than 1.

Several exemplary embodiments accompanied with figures are described in detail below to further describe the disclosure in details.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION

Figure 1:
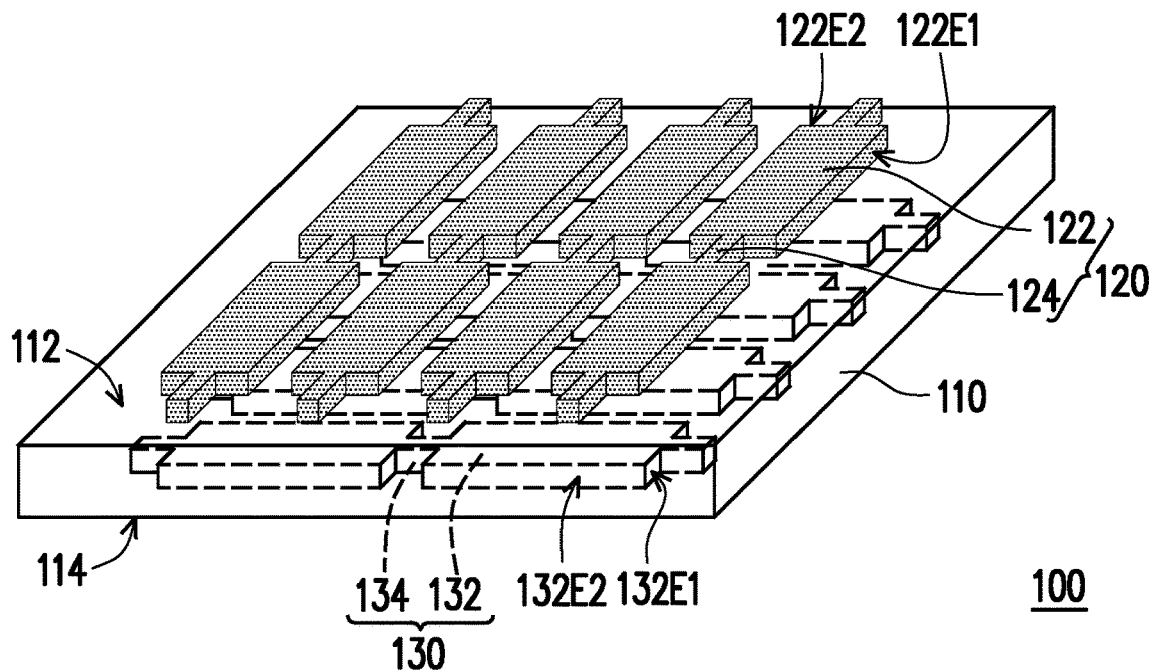
FIG. 1 is a local schematic view of a tactile sensor according to an exemplary embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

FIG. 1 is a local schematic view of a tactile sensor according to an exemplary embodiment of the disclosure. As shown in FIG. 1, a tactile sensor 100 includes an elastic dielectric layer 110, a plurality of first ribbon electrodes 120, and a plurality of second ribbon electrodes 130. A material of the elastic dielectric layer 110 includes polydimethylsiloxane (PDMS), silicone resin, epoxy, or a combination of the foregoing. In other embodiments, dielectric materials which may generate compressive deformation and/or stretching deformation when subject to an external force and may restore to an original state after being deformed may all be used to fabricate the elastic dielectric layer 110. A thickness of the elastic dielectric layer 110 may range between 50 microns and 500 microns, and a hardness of the elastic dielectric layer 110 may be Shore A hardness of 30 to 90. The elastic dielectric layer 110 has a first surface 112 and a second surface 114 opposite to each other. The first ribbon electrodes 120 are all disposed on the first surface 112, and the second ribbon electrodes 130 are all disposed on the second surface 114. In other words, the elastic dielectric layer 110 is interposed between the first ribbon electrodes 120 and the second ribbon electrodes 130.

Figure 2A:
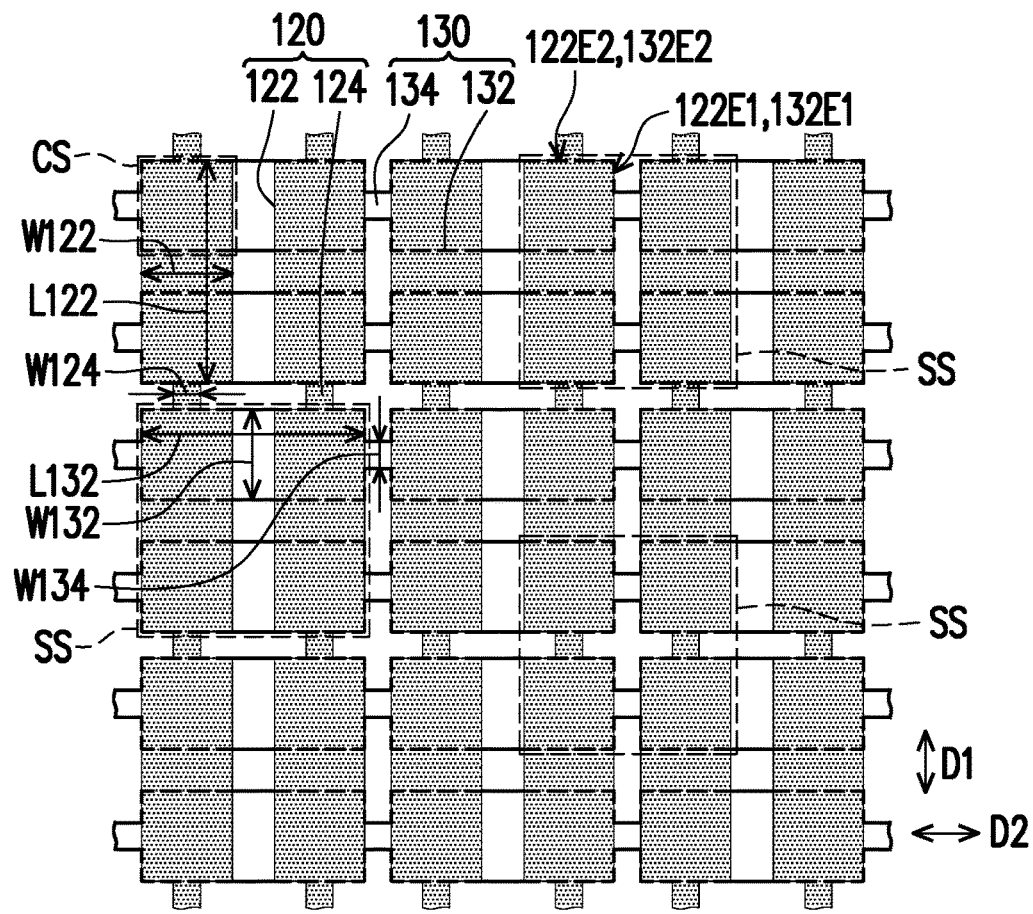
FIG. 2A and FIG. 2B are top schematic views of first ribbon electrodes and second ribbon electrodes in a tactile sensor according to an exemplary embodiment of the disclosure.
Figure 2B:
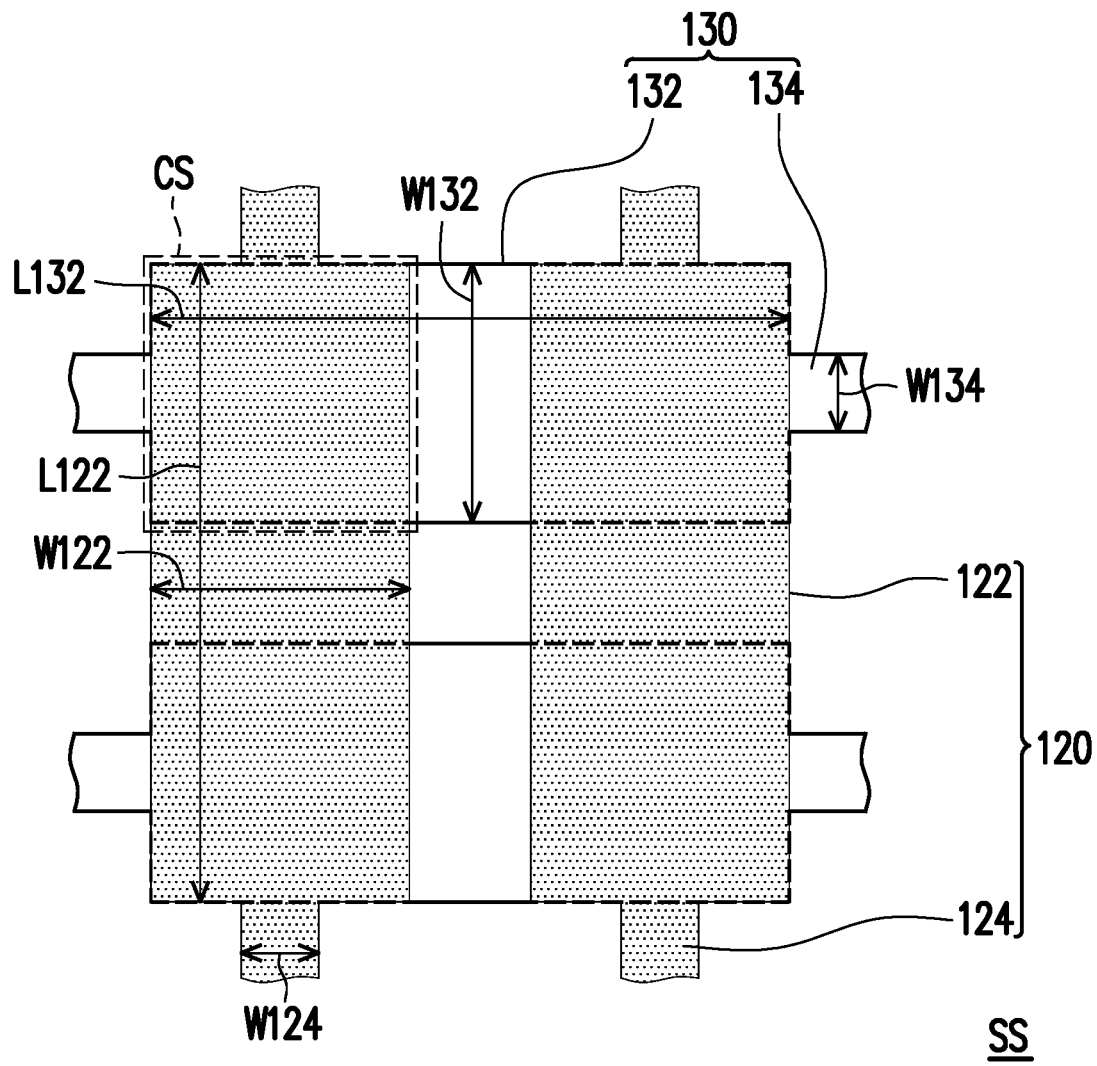

The first ribbon electrodes 120 and the second ribbon electrodes 130 are both made of conductive materials and patterned to have fixed shapes and contours. FIG. 2A and FIG. 2B are top schematic views of first ribbon electrodes and second ribbon electrodes in a tactile sensor according to an exemplary embodiment of the disclosure. Each of the first ribbon electrodes 120 extends in a first direction D1, and the first ribbon electrodes 120 are arranged parallel to each other. Each of the first ribbon electrodes 120 includes a plurality of first sensing portions 122 and a plurality of first connecting portions 124. Each of the first connecting portions 124 is connected between adjacent two first sensing portions 122. Each of the first ribbon electrodes 120 may be an electrode constituted by the first sensing portions 122 serially connected via the first connecting portions 124. In other embodiments, each of the first ribbon electrodes 120 may include a wire extending over an entire length of each of the first ribbon electrodes 120 to serially connect the first sensing portions 122, as such, the first connecting portions 124 may be replaced by the wire.

Each of the second ribbon electrodes 130 extends in a second direction D2, and the second ribbon electrodes 130 are arranged parallel to each other. Herein, the first direction D1 and the second direction D2 are perpendicular to each other, but the disclosure is not limited thereto. Each of the second ribbon electrodes 130 includes a plurality of second sensing portions 132 and a plurality of second connecting portions 134. Each of the second connecting portions 134 is connected between adjacent two second sensing portions 132. Each of the second ribbon electrodes 130 may be an electrode constituted by the second sensing portions 132 serially connected via the second connecting portions 134. In other embodiments, each of the second ribbon electrodes 130 may include a wire extending over an entire length of each of the second ribbon electrodes 130 to serially connect the second sensing portions 132, as such, the second connecting portions 134 may be replaced by the wire.

Each of the first sensing portions 122 has a first extending length L122 in the first direction D1, and the first extending length L122 is sufficient for one single first sensing portion 122 to cross over N second ribbon electrodes 130. N is a positive integer greater than 1. In addition, each of the second sensing portions 132 has a second extending length L132 in the second direction D2, and the second extending length L132 is sufficient for one single second sensing portion 132 to cross over M first ribbon electrodes 120. M is a positive integer greater than 1. In FIG. 2A and FIG. 2B, one single first sensing portion 122 of each of the first ribbon electrodes 120 crosses over N second sensing portions 132 of the second ribbon electrodes 130, and one single second sensing portion 132 of each of the second ribbon electrodes 130 crosses over M first sensing portions 122 of the first ribbon electrodes 120. Moreover, both N and M are 2. But the embodiment of the disclosure is not limited to the above. One of the first sensing portions 122 may overlap one of the second sensing portions 132 to define one capacitance sensing unit CS based on the above configuration. Besides, one shear sensing element SS may be defined by each of the N×M capacitance sensing units CS.

Each of the first sensing portions 122 has a first edge 122E1 parallel to the first direction D1 and a first edge 122E2 parallel to the second direction D2. Each of the second sensing portions 132 has a second edge 132E1 parallel to the first direction D1 and a second edge 132E2 parallel to the second direction D2. According to the present embodiment, one of the first edges 122E1 is aligned with one of the second edges 132E1, and one of the first edges 122E2 is aligned with one of the second edges 132E2. That is, part of the edges of each of the first sensing portions 122 may be aligned with part of the edges of one of the second ribbon electrodes 130. Similarly, part of the edges of each of the second sensing portions 132 may be aligned with part of the edges of one of the first ribbon electrodes 120.

According to the present embodiment, a width W122 of each of the first sensing portions 122 measured in the second direction D2 is greater than a width W124 of each of the first connecting portions 124 measured in the second direction D2. For instance, the width W124 of the first connecting portion 124 may be less than or equal to ½ of the width W122 of the first sensing portion 122. The width W124 of the first connecting portion 124 may be ⅓, ¼, or other proportions of the width W122 of the first sensing portion 122. Similarly, a width W132 of each of the second sensing portions 132 measured in the first direction D1 is greater than a width W134 of each of the second connecting portions 134 measured in the first direction D1. The width W134 of the second connecting portion 134 may be less than or equal to ½ of the width W132 of the second sensing portion 132. The width W134 of the second connecting portion 134 may be ⅓, ¼, or other proportions of the width W132 of the second sensing portion 132.

In this embodiment, the capacitance sensing unit CS is defined by an overlapping area between the first sensing portion 122 and the second sensing portion 132. The elastic dielectric layer 110 between the first ribbon electrodes 120 and the second ribbon electrodes 130 may be stretchable and compressible. As such, when the shear sensing element SS subjects to a shear force, a relative position between the first ribbon electrodes 120 and the second ribbon electrodes 130 may be altered. If the width of the first connecting portion 124 and the width of the second connecting portion 134 are close to the width of the first sensing portion 122 and the width of the second sensing portion 132, when the first ribbon electrodes 122 are shifted with respect to the second ribbon electrodes 132 in the first direction D1 or in the second direction D2, a capacitance change of the capacitance sensing unit CS may not be accurately determined. Therefore, the width W124 of the first connecting portion 124 is less than or equal to ½ of the width W122 of the first sensing portion 122, and the width W134 of the second connecting portion 134 is less than or equal to ½ of the width W132 of the second sensing portion 132. In this way, the capacitance change of the capacitance sensing unit CS may more accurately reflect a range of displacement of the electrodes.

Figure 3:
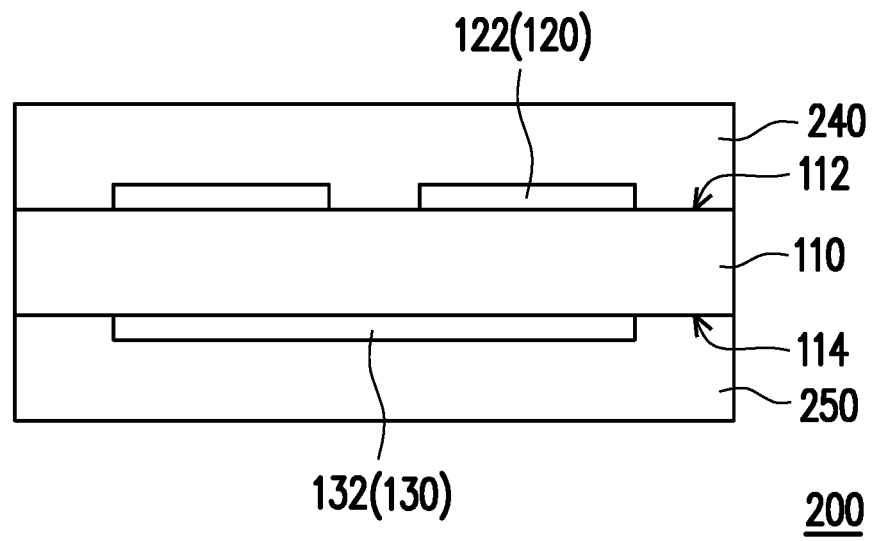
FIG. 3 is a cross-sectional schematic view of a tactile sensor according to an exemplary embodiment of the disclosure.

FIG. 3 is a cross-sectional schematic view of a tactile sensor according to an exemplary embodiment of the disclosure. As shown in FIG. 3, a tactile sensor 200 includes the elastic dielectric layer 110, the first ribbon electrodes 120, the second ribbon electrodes 130, a first supporting layer 240, and a second supporting layer 250. Relative allocation relations, pattern designs, and materials of the elastic dielectric layer 110, the first ribbon electrodes 120, and the second ribbon electrodes 130 are similar to that described in the foregoing embodiment, as such, layout design of the first ribbon electrodes 120 and the second ribbon electrodes 130 may refer to FIG. 2A and FIG. 2B. The first supporting layer 240 is disposed on the first surface 112 of the elastic dielectric layer 110, and the second supporting layer 250 is disposed on the second surface 114 of the elastic dielectric layer 110. Simultaneously, the first ribbon electrodes 120 are disposed on the first supporting layer 240, and the second ribbon electrode are disposed on the second supporting layer 250. Comparing to the elastic dielectric layer 110, the first supporting layer 240 and the second supporting layer 250 are less likely to be compressed or stretched. Therefore, the first ribbon electrodes 120 disposed on the first supporting layer 240 may have fixed gaps, and the second ribbon electrodes 130 disposed on the second supporting layer 250 may have fixed gaps. Nevertheless, distances and relative positions between the first ribbon electrodes 120 and the second ribbon electrodes 130 may be changed along with deformation of the elastic dielectric layer 110.

In this embodiment, the first ribbon electrodes 120 may first be fabricated on the first supporting layer 240, and the second ribbon electrodes 130 are fabricated on the second supporting layer 250. Next, the first supporting layer 240 on which the first ribbon electrodes 120 are disposed is attached to the first surface 112, and the second supporting layer 250 on which the second ribbon electrodes 130 are disposed is attached to the second surface 114 of the elastic dielectric layer 110 to form the tactile sensor 200. Alternatively, after the first ribbon electrodes 120 are fabricated on the first supporting layer 240 and the second ribbon electrodes 130 are fabricated on the second supporting layer 250, the elastic dielectric layer 110 is formed first by means of coating on the second supporting layer 250. After the elastic dielectric layer 110 is cured, the first supporting layer 240 is then attached to the elastic dielectric layer 110. In addition, after the elastic dielectric layer 110 is formed, the first ribbon electrodes 120 may be fabricated on the elastic dielectric layer 110, and the first supporting layer 240 is then formed on the first ribbon electrodes 120. That is, the first supporting layer 240 on which the first ribbon electrodes 120 are disposed is not required to be fabricated in advance. Instead, the first ribbon electrodes 120 and the first supporting layer 240 are fabricated on the elastic dielectric layer 110 in sequence.

The first supporting layer 240 on which the first ribbon electrodes 120 are disposed and the second supporting layer 250 on which the second ribbon electrodes 130 are disposed may respectively be composed of a printed circuit board or a flexible printed circuit board. Alternatively, the first supporting layer 240 and the second supporting layer 250 may respectively be glass substrates, plastic substrates, and other layered objects or plate-shaped objects featuring a supporting characteristic and allowing the fixed gaps between the first ribbon electrodes 120 and the fixed gaps between the second ribbon electrodes 130.

Figure 4:
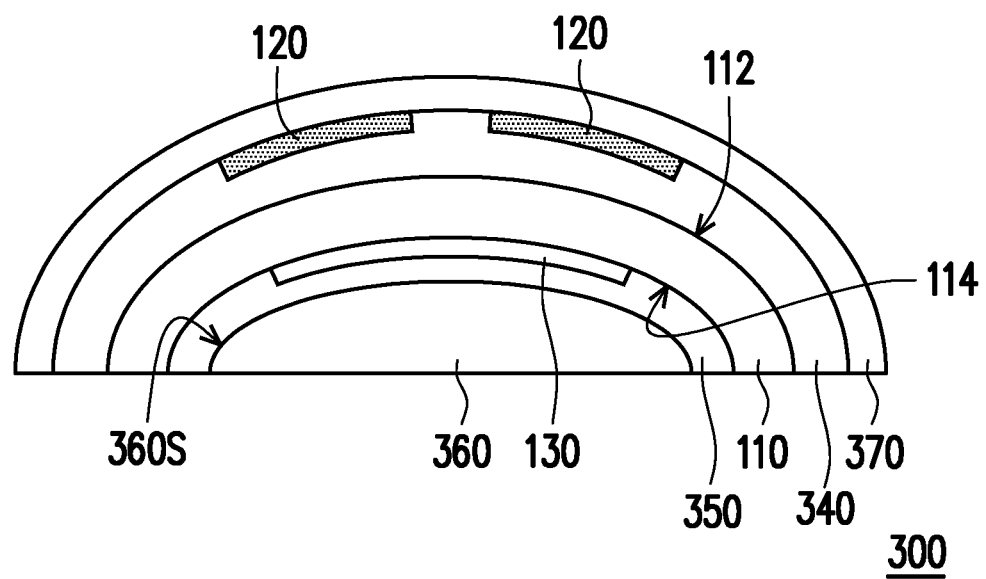
FIG. 4 is a cross-sectional schematic view of a tactile sensor according to another exemplary embodiment of the disclosure.

FIG. 4 is a cross-sectional schematic view of a tactile sensor according to another exemplary embodiment of the disclosure. As shown in FIG. 4, a tactile sensor 300 includes the elastic dielectric layer 110, the first ribbon electrodes 120, the second ribbon electrodes 130, a first supporting layer 340, a second supporting layer 350, a curved-surface substrate 360, and a protection layer 370. The relative allocation relations, pattern design, and materials of the elastic dielectric layer 110, the first ribbon electrodes 120, and the second ribbon electrodes 130 are similar to that described in the foregoing embodiment. As such, the layout design of the first ribbon electrodes 120 and the second ribbon electrodes 130 may be identical to that shown in FIG. 2A and FIG. 2B, and the characteristic of the elastic dielectric layer 110 is identical to that described in the embodiment of FIG. 1.

The first ribbon electrodes 120 are disposed on the first supporting layer 340, and the second ribbon electrodes are disposed on the second supporting layer 350. The first supporting layer 340 and the second supporting layer 350 are respectively disposed on the first surface 112 and the second surface 114 of the elastic dielectric layer 110, and the first surface 112 and the second surface 114 are opposite to each other. In this embodiment, the curved-surface substrate 360 is an object having a three-dimensional structure. An outer surface 360S of the curved-surface substrate 360 is a curved surface. The first supporting layer 340, the second supporting layer 350, and the elastic dielectric layer 110 are disposed on the curved-surface substrate 360 and are curved conforming to the outer surface 360S. As such, the tactile sensor 300 is a sensor with a non-planar design and may be applied to a variety of fields. For instance, the curved-surface substrate 360 may be applied to an artificial intelligence device such as a robot to act as a stress sensor.

As shown in FIG. 4, the first supporting layer 340 is disposed between the first ribbon electrodes 120 and the elastic dielectric layer 110, and the second ribbon electrodes 130 are disposed between the second supporting layer 350 and the elastic dielectric layer 110. Nevertheless, allocation locations of the ribbon electrodes and the supporting layers may vary according to different fabrication methods. In other embodiments, the allocation location of the first ribbon electrodes 120 and the first supporting layer 340 may be swapped, or the allocation location of the second ribbon electrodes 130 and the second supporting layer 350 may be swapped.

In some embodiments, a laser-triggerable material may be formed on the curved-surface substrate 360, and the laser-triggerable material may then be cured to form the second supporting layer 350. The laser-triggerable material includes a plurality of triggering particles dispersed in an insulating gel. Herein, a material of the insulating gel acting as the laser-triggerable material includes epoxy, polyurethane (PU), or cyclic olefin copolymer/polymer (COC/COP), and the like. The triggering particles may be organic metal particles and metal chelates composed of gold, silver, copper, tin, aluminum, nickel, and palladium. The triggering particles may also be gallium nitride, zinc sulfide, silicon carbide, zinc oxide, titanium dioxide, and other semiconductor micro particles with energy gaps greater than or equal to 3 electron volts. In addition, the triggering particles may be evenly dispersed in the insulating gel and account for 0.1% to 30% of a percentage by weight of the laser-triggerable material. The laser triggerable material may be formed on the curved-surface substrate 360 by means of spray coating. As such, the second supporting layer 350 may be curved along with the curved-surface substrate 360. After the laser triggerable material is cured, a surface laser process may be performed on a surface of the second supporting layer 350. The step of the surface laser process includes that a laser beam irradiates on a selected region of the surface of the second supporting layer 350 to form a pattern in the selected region.

The second ribbon electrodes 130 may then be formed at a location of the pattern through an electroless plating method. Herein, in the electroless plating method, the second supporting layer 350 (and the curved-surface substrate 360) is immersed in a plating solution, for example, such that a conductive metal material is deposited on the region of the pattern to form the second ribbon electrodes 130. The plating solution may be a copper plating solution, a nickel plating solution, or other plating solution capable of forming the conductive metal material on the region of the pattern via the electroless plating process.

After the step of forming the second ribbon electrodes 130, the elastic dielectric layer 110 may be formed on the second ribbon electrodes 130 and the second supporting layer 350. The material of the elastic dielectric layer 110 includes polydimethylsiloxane (PDMS), silicone resin, epoxy, or a combination of the foregoing. In other embodiments, the dielectric materials which may generate compressive deformation and/or stretching deformation when subjecting to an external force and may restore to an original state after being deformed may all be used to fabricate the elastic dielectric layer 110. The thickness of the elastic dielectric layer 110 may range between 50 microns and 500 microns, and the hardness of the elastic dielectric layer 110 may be Shore A hardness of 30 to 90. The elastic dielectric layer 110 may be formed on the second ribbon electrodes 130 and the second supporting layer 350 by means of coating. As such, the elastic dielectric layer 110 may be curved conforming to the second supporting layer 350.

The fabrication method identical to that of the second ribbon electrodes 130 and the second supporting layer 350 may then be adopted to form the first ribbon electrodes 120 and the first supporting layer 340 on the elastic dielectric layer 110. Besides, the protection layer 370 may further be formed on the first ribbon electrodes 120 and the first supporting layer 340, and that the tactile sensor 300 is completed. The protection layer 370 may be formed on the first supporting layer 340 by means of coating. A material of the protection layer 370 may include an insulation polymer material, such as polyimide, acrylic resins, or polyurethane (PU), and the like.

In this embodiment, the elastic dielectric layer 110, the first ribbon electrodes 120, the second ribbon electrodes 130, the first supporting layer 340, the second supporting layer 350, and the protection layer 370 are formed on the curved-surface substrate 360 without being attached. Therefore, the elastic dielectric layer 110, the first ribbon electrodes 120, the second ribbon electrodes 130, the first supporting layer 340, the second supporting layer 350, and the protection layer 370 are curved in shape along with the outer surface 360S of the curved-surface substrate 360 without subjecting to the stress generated by curving, such that the tactile sensor 300 may deliver a favorable yield and service life.

In other embodiments, the first ribbon electrodes 120 may be fabricated on the first supporting layer 340 first, the second ribbon electrodes 130 may be fabricated on the second supporting layer 350, the elastic dielectric layer 110 is fabricated into a film in advance, and the second supporting layer 350, the elastic dielectric layer 110, and the first supporting layer 340 are then attached onto the curved-surface substrate 360 in sequence. In this case, a material having greater tolerance to bending stress may be selected for the elastic dielectric layer 110, the first supporting layer 340, and the second supporting layer 350, and favorable yield and service life may thus be achieved. If the second supporting layer 350, the elastic dielectric layer 110, and the first supporting layer 340 are formed on the curved-surface substrate 360 in sequence by being attached, a stacking order of the first ribbon electrodes 120 and the first supporting layer 340 and a stacking order of the second ribbon electrodes 130 and the second supporting layer 350 may be identical to the relationships illustrated in FIG. 4 but may also be different from the relationships illustrated in FIG. 4.

With reference to FIG. 2A and FIG. 2B, according to the top views, one single first sensing portion 122 of each of the first ribbon electrodes 120 crosses over N second sensing portions 132 of the second ribbon electrodes 130, and one single second sensing portion 132 of each of the second ribbon electrodes 130 crosses over M first sensing portions 122 of the first ribbon electrodes 120. Both N and M are 2. One of the first sensing portions 122 may overlap one of the second sensing portions 132 to define one capacitance sensing unit CS based on the above configuration. Besides, one shear sensing element SS may be defined by each of the N×M capacitance sensing units CS. A sensing operation of the shear sensing element SS is described along with drawings as follows.

Figure 5:
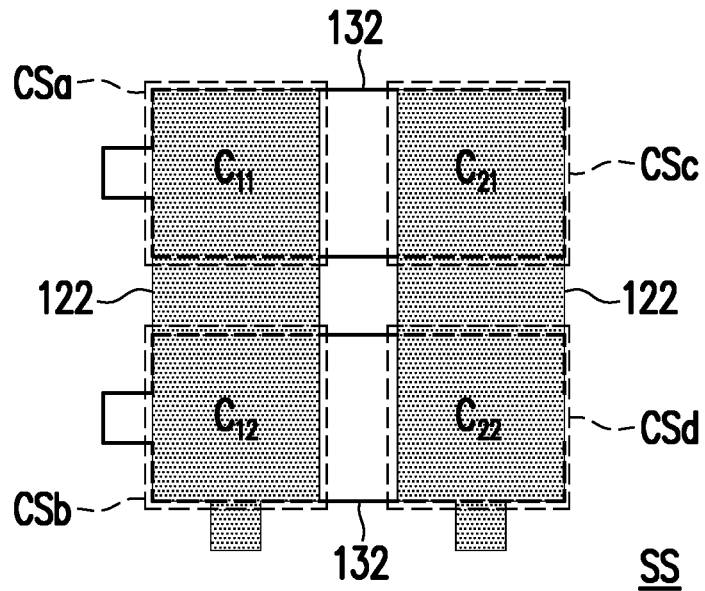
FIG. 5 is a cross-sectional schematic view of a shear sensing element not subjecting to a shear force according to an exemplary embodiment of the disclosure.

FIG. 5 is a cross-sectional schematic view of a shear sensing element not being applied by a shear force according to an exemplary embodiment of the disclosure. The shear sensing element SS is constituted by two first sensing portions 122 and two second sensing portions 132 and thus includes four capacitance sensing units CSa, CSb, CSc, and CSd arranged in a 2×2 arrangement. The four capacitance sensing units CSa, CSb, CSc, and CSd are respectively defined by an overlapping area of one of the first sensing portions 122 overlapping one of the second sensing portions 132. The capacitance value of the four capacitance units CSa, CSb, CSc, and CSd may respectively be presented by a capacitance $C_{11}$, a capacitance $C_{12}$, a capacitance $C_{21}$, and a capacitance $C_{22}$, hereafter.

Figure 6:
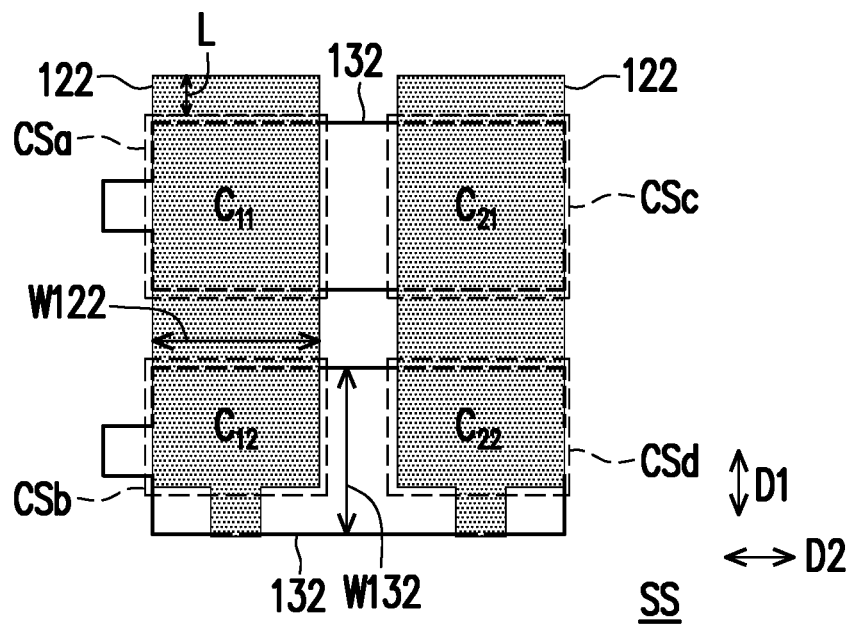
FIG. 6 to FIG. 8 are cross-sectional schematic views of a shear sensing element subjecting to a shear force according to an exemplary embodiment of the disclosure.
Figure 7:
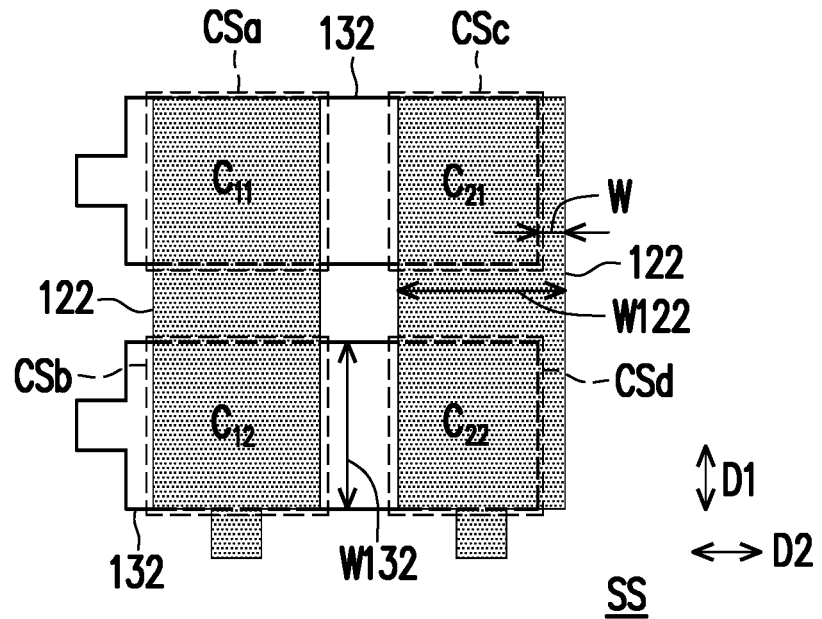
Figure 8:
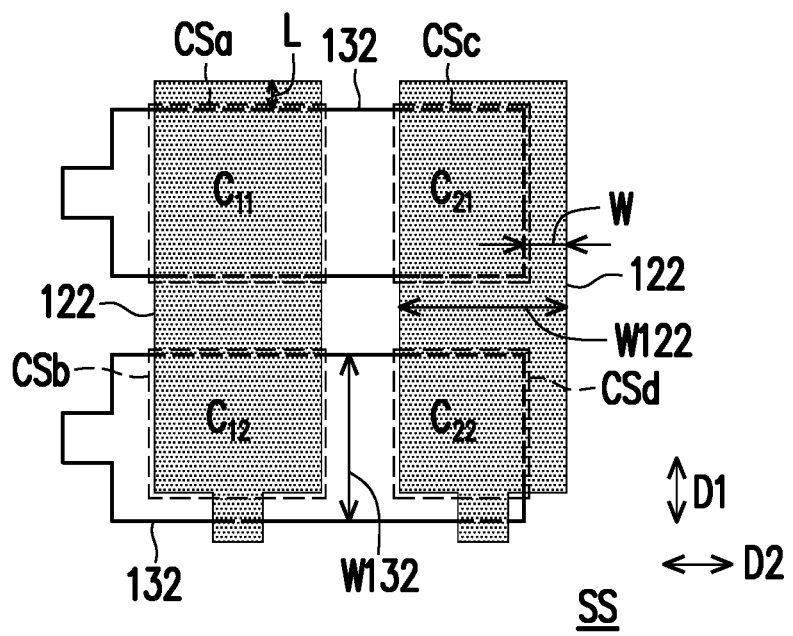

FIG. 6 to FIG. 8 are cross-sectional schematic views of a shear sensing element subjecting to a shear force according to an exemplary embodiment of the disclosure. In FIG. 6, the shear sensing element SS subjects to a shear force in the first direction D1, as such, the first sensing portions 122 are displaced by a distance L relative to the second sensing portions 132 in the first direction D1. At this time, an area of the capacitance sensing unit CSa and an area of the capacitance sensing unit CSc are not changed, such that the capacitance $C_{11}$ and the capacitance $C_{21}$ are not changed. Nevertheless, an area of the capacitance sensing unit CSb and an area of the capacitance sensing unit CSd are scaled down as the electrodes are displaced, as such, the capacitance $C_{12}$ and the capacitance $C_{22}$ are reduced. A reduction quantity of the capacitance $C_{12}$ and a reduction quantity of the capacitance $C_{22}$ are proportional to a displacement quantity of the electrodes. In this way, a magnitude of the shear force applied to the shear sensing element SS in the first direction D1 may be determined by a ratio of the capacitance $C_{11}$ to the capacitance $C_{12}$ or be determined by a ratio of the capacitance $C_{21}$ to the capacitance $C_{22}$.

In FIG. 7, the shear sensing element SS subjects to a shear force in the second direction D2, as such, the first sensing portions 122 are displaced by a distance W relative to the second sensing portions 132 in the second direction D2. At this time, the area of the capacitance sensing unit CSa and the area of the capacitance sensing unit CSb are not changed, such that the capacitance $C_{11}$ and the capacitance $C_{12}$ are not changed. Nevertheless, the area of the capacitance sensing unit CSc and the area of the capacitance sensing unit CSd are scaled down as the electrodes are displaced, as such, the capacitance $C_{21}$ and the capacitance $C_{22}$ are reduced. A reduction quantity of the capacitance $C_{21}$ and the reduction quantity of the capacitance $C_{22}$ are proportional to the displacement quantity of the electrodes. In this way, a magnitude of the shear force applied to the shear sensing element SS in the second direction D2 may be determined by a ratio of the capacitance $C_{21}$ to the capacitance $C_{11}$ or be determined by a ratio of the capacitance $C_{22}$ to the capacitance $C_{12}$.

In FIG. 8, the shear sensing element SS subjects to an oblique shear force, as such, the first sensing portions 122 are displaced by the distance L in the first direction D1 and are displaced by the distance W in the second direction D2 relative to the second sensing portions 132. At this time, the area of the capacitance sensing unit CSa is not changed, such that the capacitance $C_{11}$ is not changed. Nevertheless, the area of the capacitance sensing unit CSb, the area of the capacitance sensing unit CSc, and the area of the capacitance sensing unit CSd are scaled down as the electrodes are displaced, as such, the capacitance $C_{12}$, the capacitance $C_{21}$, and the capacitance $C_{22}$ are reduced. The reduction quantity of the capacitance $C_{12}$, the reduction quantity of the capacitance $C_{21}$, and the reduction quantity of the capacitance $C_{22}$ are proportional to the displacement quantity of the electrodes. In this way, a magnitude of the shear force applied to the shear sensing element SS in the first direction D1 may be determined by a ratio of the capacitance $C_{11}$ to the capacitance $C_{12}$ or a ratio of the capacitance $C_{21}$ to the capacitance $C_{22}$. A magnitude of the shear force applied to the shear sensing element SS in the second direction D2 may be determined by a ratio of the capacitance $C_{21}$ to the capacitance $C_{11}$ or be determined by a ratio of the capacitance $C_{22}$ to the capacitance $C_{12}$.

Figure 9:
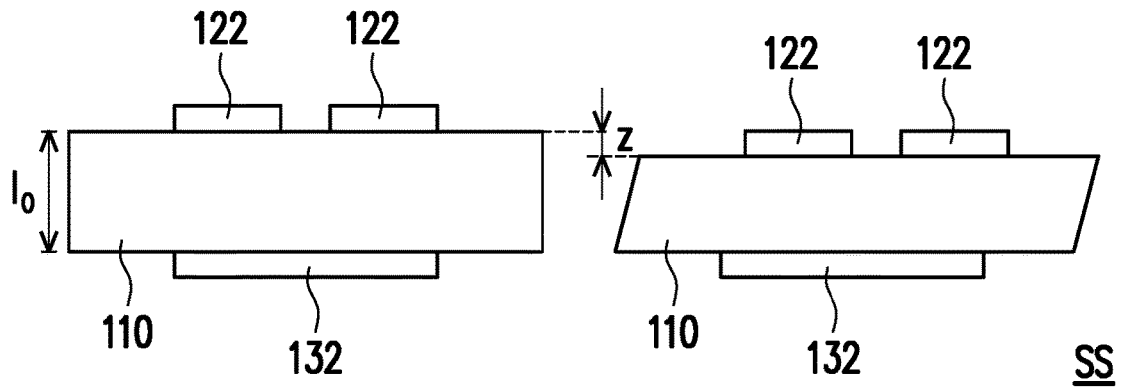
FIG. 9 is a cross-sectional schematic view of a shear sensing element not subjecting to a stress and subjecting to a stress according to an exemplary embodiment of the disclosure.

FIG. 9 is a cross-sectional schematic view of a shear sensing element not subjecting to a stress and being subjecting to a stress according to an exemplary embodiment of the disclosure. With reference to FIG. 9, the elastic dielectric layer 110 is disposed between the first sensing portions 122 and the second sensing portions 132 of the shear sensing element SS. When a stress is applied, a thickness 10 of the elastic dielectric layer 110 is compressed from an original state and is reduced by a distance z as shown in FIG. 9. Capacitance between the first ribbon electrodes 122 and the second ribbon electrodes 132 increases when such stress is applied. Further, when the distance z increases, a quantity of increase of the capacitance grows as well.

It can be seen from FIG. 6 to FIG. 9 that when the stress is applied to the shear sensing element SS, the first sensing portions 122 and the second sensing portions 132 are displaced relative to each other in the first direction D1 and/or in the second direction D2, and moreover, a distance between the first ribbon electrodes 122 and the second ribbon electrodes 132 in a thickness direction is changed as well. Therefore, when the shear sensing element SS subjects to a stress, in addition to being displaced horizontally, capacitance of each of the capacitance sensing units CS may also be changed owing to the distance change in the thickness direction. Nevertheless, regardless of the horizontal displacement, the capacitance of at least one of the capacitance sensing units CS in the shear sensing element SS is not affected by the horizontal displacement to be changed.

With reference to FIG. 6, for example, the capacitances of the capacitance sensing unit CSa and the capacitance sensing unit CSc are not changed when the electrodes are displaced horizontally in the first direction D1. As such, when the shear sensing element SS subjects to a stress, if the electrode displacement in FIG. 6 occurs, the capacitance changes of the capacitance sensing unit CSa and the capacitance sensing unit CSc may be used to determine the distance of the distance z in FIG. 9. With reference to FIG. 7, for example, the capacitances of the capacitance sensing unit CSa and the capacitance sensing unit CSb are not changed when the electrodes are displaced horizontally in the second direction D2. As such, when the shear sensing element SS subjects to a stress, if the electrode displacement in FIG. 7 occurs, the capacitance changes of the capacitance sensing unit CSa and the capacitance sensing unit CSb may be used to determine the distance of the distance z in FIG. 9. With reference to FIG. 8, for example, the capacitance of the capacitance sensing unit CSa is not changed when the electrodes are displaced horizontally obliquely with respect to the first direction D1 and the second direction D2. As such, when the shear sensing element SS subjects to a stress, if the electrode displacement in FIG. 8 occurs, the capacitance change of the capacitance sensing unit CSa may be used to determine the distance of the distance z in FIG. 9.

For instance, if the electrode displacement in FIG. 8 occurs, the distance z may be obtained through the following formula: $z=l_0-(\varepsilon/C_{11})\times(W132\times W122)$. Herein, $\varepsilon$ is a dielectric constant of the elastic dielectric layer 110, $C_{11}$ is the capacitance value of the capacitance sensing unit CSa in FIG. 8, W132 is the width of the second sensing portion 132 in the first direction D1, W122 is the width of the first sensing portion 122 in the second direction D2, and $l_0$ is the thickness of the elastic dielectric layer 110 before subjecting to the stress. As such, a magnitude of a normal stress F being applied to the shear sensing element SS parallel to the thickness direction is $F=E(z/10)$, wherein E is a Young's modulus of the elastic dielectric layer 110.

Besides, the distance of the horizontal displacement of the electrodes in FIG. 6 to FIG. 8 may be obtained through the following formula as a value of the capacitance is proportional to areas of the electrodes. The distance L may be obtained through the following formula in FIG. 6 and FIG. 8:

$L=(1-C_{12}/C_{11})\times W132$ . . . or $L=(1-C_{22}/C_{21})\times W132$, wherein W132 is the width of the second sensing portion 132 in the first direction D1. The distance W may be obtained through the following formula in FIG. 7 and FIG. 8: $W=(1-C_{21}/C_{11})\times W122$ or $W=(1-C_{22}/C_{12})\times W122$, wherein W122 is the width of the first sensing portion 122 in the second direction.

Figure 10:
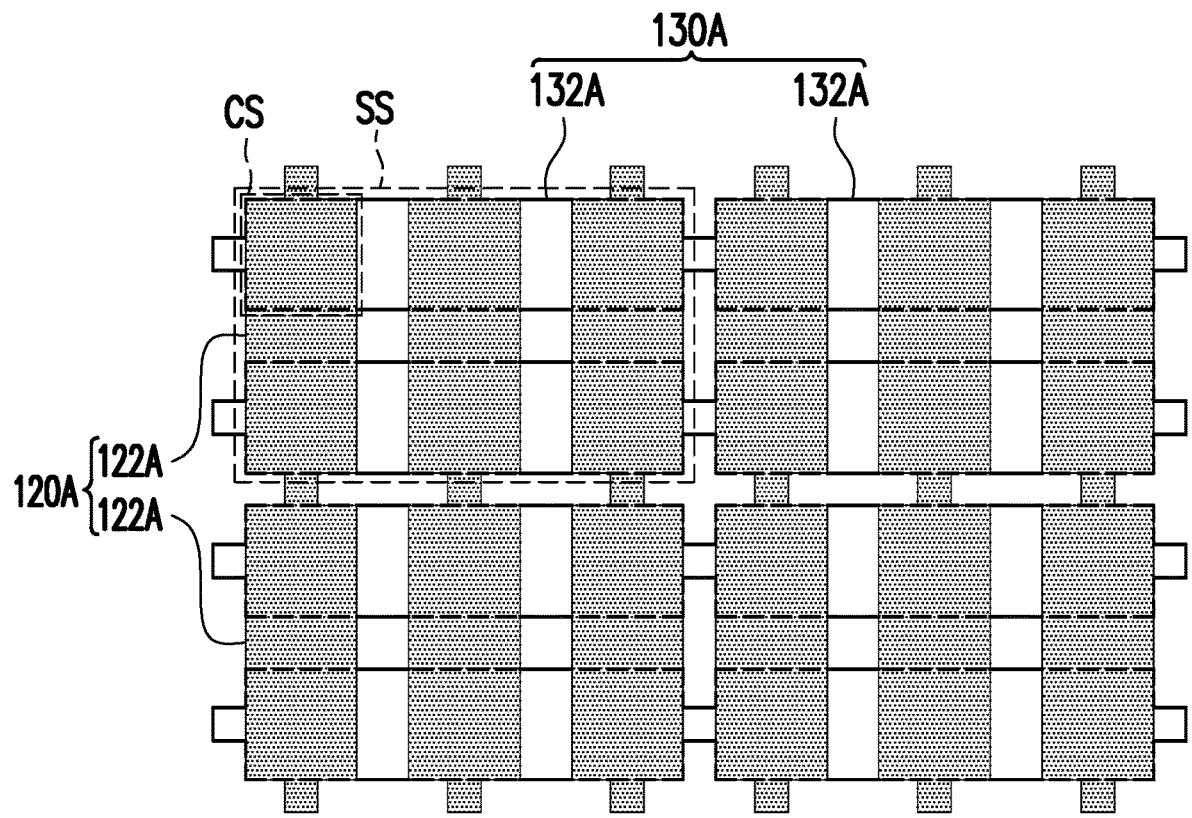
FIG. 10 is a top schematic view of first ribbon electrodes and second ribbon electrodes in a tactile sensor according to another exemplary embodiment of the disclosure.

FIG. 10 is a top schematic view of first ribbon electrodes and second ribbon electrodes in a tactile sensor according to another exemplary embodiment of the disclosure. In FIG. 10, one single first sensing portion 122A of each of first ribbon electrodes 120A crosses over N second sensing portions 132A of second ribbon electrodes 130A, and one single second sensing portion 132A of each of the second ribbon electrodes 130A crosses over M first sensing portions 122A of the first ribbon electrodes 120A. N is equal to 2, and M is equal to 3. One of the first sensing portions 122A may overlap one of the second sensing portions 132A to define one capacitance sensing unit CS based on the above configuration. Besides, one shear sensing element SS may be defined by each of the N×M, such as 2×3 capacitance sensing units CS.

Figure 11:
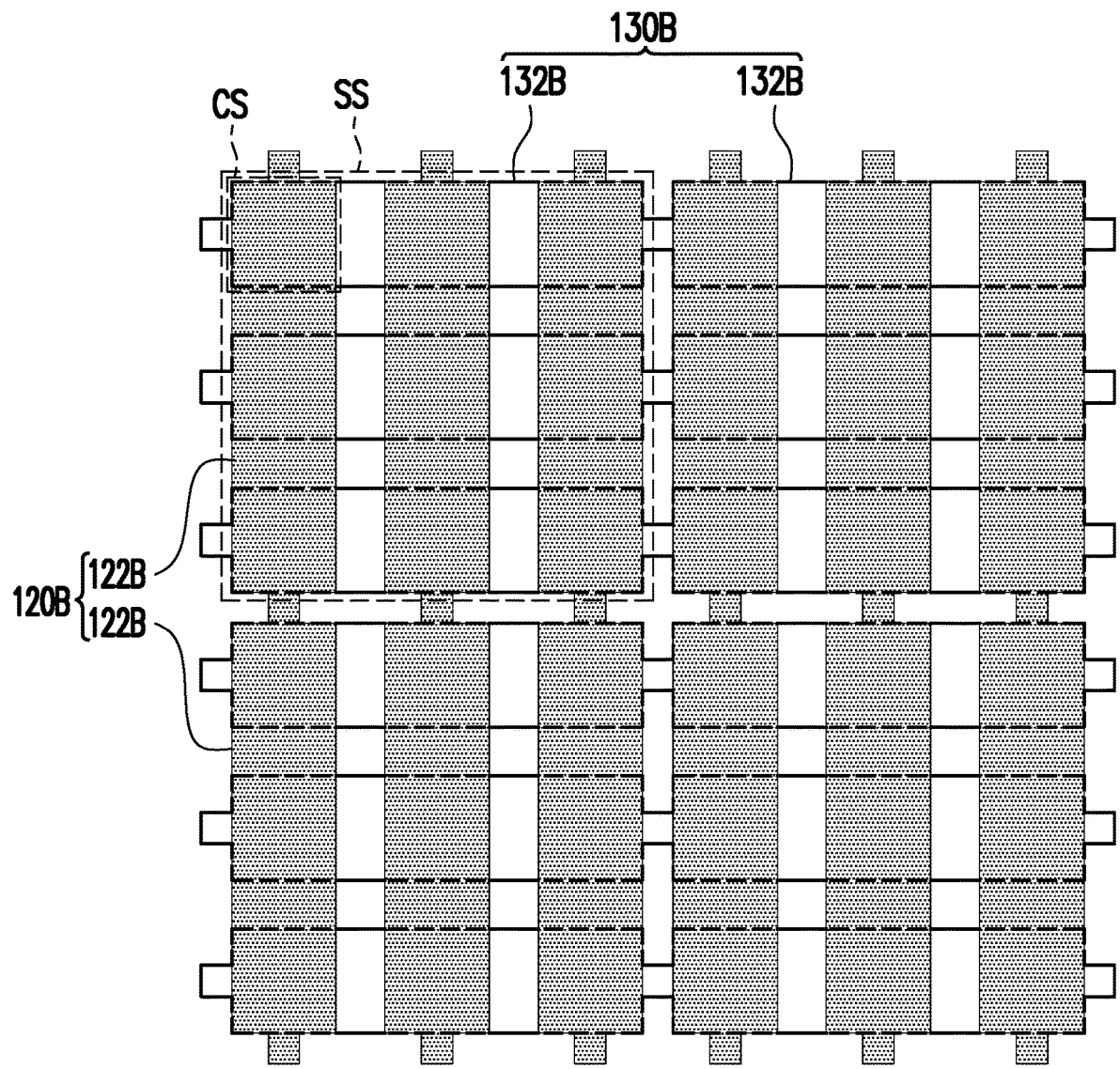
FIG. 11 is a top schematic view of first ribbon electrodes and second ribbon electrodes in a tactile sensor according to yet another exemplary embodiment of the disclosure.

FIG. 11 is a top schematic view of first ribbon electrodes and second ribbon electrodes in a tactile sensor according to yet another exemplary embodiment of the disclosure. In FIG. 11, one single first sensing portion 122B of each of first ribbon electrodes 120B crosses over N second sensing portions 132B of second ribbon electrodes 130B, and one single second sensing portion 132B of each of the second ribbon electrodes 130B crosses over M first sensing portions 122B of the first ribbon electrodes 120B. Both N and M are 3. One of the first sensing portions 122B may overlap one of the second sensing portions 132B to define one capacitance sensing unit CS based on the above configuration. One shear sensing element SS may be defined by each of the N×M, such as 3×3 capacitance sensing units CS.

Figure 12:
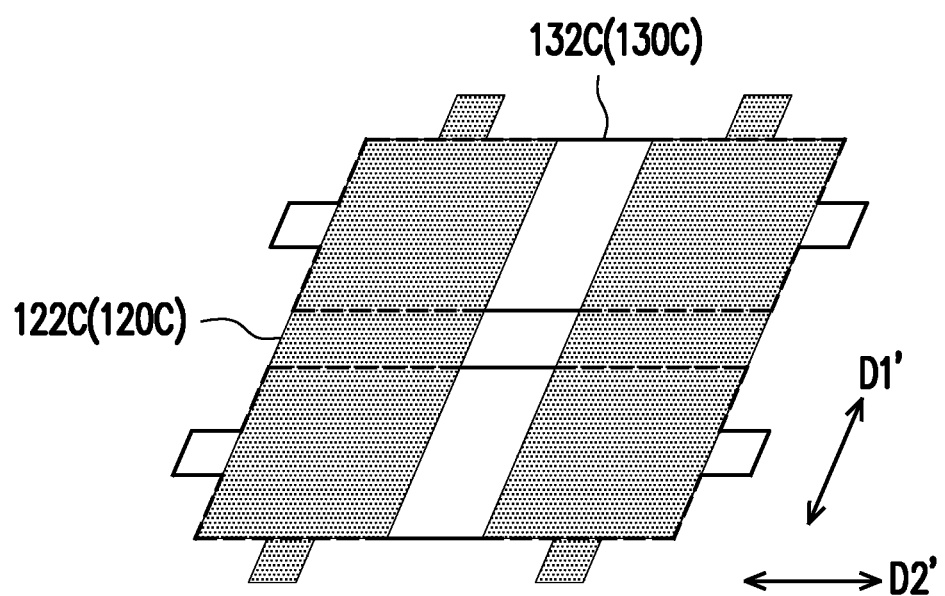
FIG. 12 is a top schematic view of first ribbon electrodes and second ribbon electrodes in a tactile sensor according to still another exemplary embodiment of the disclosure.

FIG. 12 is a top schematic view of first ribbon electrodes and second ribbon electrodes in a tactile sensor according to still another exemplary embodiment of the disclosure. In FIG. 12, each of a plurality of first ribbon electrodes 120C extends in a first direction D1', and the first ribbon electrodes 120C are arranged parallel to each other. Each of a plurality of second ribbon electrodes 130C extends in a second direction D2', and the second ribbon electrodes 130C are arranged parallel to each other. Herein, the first direction D1' and the second direction D2' intersect each other but are not perpendicular to each other. Each of the first ribbon electrodes 120C includes a plurality of first sensing portions 122C serially connected. Each of the second ribbon electrodes 130C includes a plurality of second sensing portions 132C serially connected. One single first sensing portion 122C of each of the first ribbon electrodes 120C crosses over N second sensing portions 132C of the second ribbon electrodes 130C, and one single second sensing portion 132C of each of the second ribbon electrodes 130C crosses over M first sensing portions 122C of the first ribbon electrodes 120C. Both N and M are 2. Nevertheless, in other embodiments, N and M may be other positive integers greater than 1, and N and M are not required to be equal.

In thus can be seen from FIG. 2A, FIG. 2B, FIG. 10, FIG. 11, and FIG. 12 that in the first ribbon electrodes and the second ribbon electrodes, N and M may be designed not to be equal or to be equal. Moreover, the extending directions of the first ribbon electrodes and the second ribbon electrodes may intersect in a perpendicular manner or in a non-perpendicular manner. The first ribbon electrodes 120A and the second ribbon electrodes 130A in FIG. 10 may be applied to any one of the tactile sensor 200 of FIG. 3 and the tactile sensor 300 of FIG. 4. The first ribbon electrodes 120B and the second ribbon electrodes 130B in FIG. 11 may also be applied to any one of the tactile sensor 200 of FIG. 3 and the tactile sensor 300 of FIG. 4. Moreover, the first ribbon electrodes 120C and the second ribbon electrodes 130C in FIG. 12 may also be applied to any one of the tactile sensor 200 of FIG. 3 and the tactile sensor 300 of FIG. 4.

The tactile sensor described in the foregoing embodiments may be used to realize sensing of the compression stress and may also be used to realize sensing of the shear stress and thereby may be used to simulate the human touch. For instance, the tactile sensor in the foregoing embodiments may be applied to fingers of a robot. When the robot picks up an object with the fingers, a gripping force applied to the object may be determined through the tactile sensor. When the shear force (e.g., the situations of FIG. 6 to FIG. 8 occur) is sensed by the tactile sensor, it is indicated that the object is displaced (e.g., sliding). At this time, the robot may adjust the gripping force of the fingers picking up the object until the shear force changes are no longer sensed, as such, the object is prevented from being slipped through the fingers of the robot, and an action mode of the robot is closer to that of the human.

In view of the foregoing, in the tactile sensor provided by the embodiments of the disclosure, one single sensing portion of the first ribbon electrodes is designed to cross over multiple sensing portions of the second ribbon electrodes to realize sensing of the shear force stress. In addition to the compression stress, the shear stress may also be sensed. Therefore, the multi-dimensional stress sensing under a simple two-layer electrode structure may be achieved through the tactile sensor. In addition, the tactile sensor provided by the embodiments of the disclosure may be fabricated on the curved-surface substrate without being attached, the tactile sensor may thereby be applied in devices with non-planar design and may further be applied to diverse application fields.

It will be apparent to those skilled in the art that various modifications and variations can be made to the disclosed embodiments. It is intended that the specification and examples be considered as exemplary only, with a true scope of the disclosure being indicated by the following claims and their equivalents.

The invention claimed is:

1. A tactile sensor, comprising:
an elastic dielectric layer, having a first surface and a second surface opposite to each other;
a plurality of first ribbon electrodes, disposed on the first surface, each of the first ribbon electrodes extending in a first direction and comprising a plurality of first sensing portions serially connected in the first direction; and
a plurality of second ribbon electrodes, disposed on the second surface, each of the second ribbon electrodes extending in a second direction, the first direction intersecting the second direction, wherein each of the first sensing portions has a first extending length in the first direction to cross over N second ribbon electrodes, each of the first sensing portions has a first edge parallel to the second direction, the first edge is aligned with an edge of one of the second ribbon electrodes, and N is a positive integer greater than 1.

2. The tactile sensor as claimed in claim 1, wherein each of the first ribbon electrodes further comprises a plurality of first connecting portions, each of the first connecting portions is connected between adjacent two first sensing portions, and a width of each of the first sensing portions is greater than a width of each of the first connecting portions.

3. The tactile sensor as claimed in claim 2, wherein a width of each of the first connecting portions measured in the second direction is less than or equal to ½ of a width of each of the first sensing portions measured in the second direction.

4. The tactile sensor as claimed in claim 1, wherein each of the second ribbon electrodes comprises a plurality of second sensing portions serially connected in the second direction.

5. The tactile sensor as claimed in claim 4, wherein each of the second ribbon electrodes further comprises a plurality of second connecting portions, each of the second connecting portions is connected between adjacent two second sensing portions, and a width of each of the second sensing portions is greater than a width of each of the second connecting portions.

6. The tactile sensor as claimed in claim 4, wherein each of the first sensing portions crosses over N second sensing portions.

7. The tactile sensor as claimed in claim 4, wherein each of the second sensing portions has a second extending length in the second direction to cross over M first sensing portions, and M is a positive integer greater than 1.

8. The tactile sensor as claimed in claim 4, wherein the first edge of each of the first sensing portions is aligned with an edge of one of the second sensing portions.

9. The tactile sensor as claimed in claim 4, wherein a second edge of each of the second sensing portions parallel to the first direction is aligned with the first edge of one of the first sensing portions parallel to the first direction.

10. The tactile sensor as claimed in claim 1, wherein the first direction is perpendicular to the second direction.

11. The tactile sensor as claimed in claim 1, further comprising a first supporting layer and a second supporting layer, respectively disposed on the first surface and the second surface of the elastic dielectric layer, wherein the first ribbon electrodes are disposed on the first supporting layer and the second ribbon electrodes are disposed on the second supporting layer.

12. The tactile sensor as claimed in claim 11, wherein the first ribbon electrodes are located between the first supporting layer and the elastic dielectric layer.

13. The tactile sensor as claimed in claim 11, wherein the second ribbon electrodes are located between the second supporting layer and the elastic dielectric layer.

14. The tactile sensor as claimed in claim 11, wherein the first supporting layer is located between the first ribbon electrodes and the elastic dielectric layer.

15. The tactile sensor as claimed in claim 11, further comprising a curved-surface substrate, wherein the second supporting layer is disposed on the curved-surface substrate and conforms to the curved-surface substrate.

16. The tactile sensor as claimed in claim 11, wherein the second supporting layer is composed of an insulating gel and a plurality of triggering particles dispersed in the insulating gel.

17. The tactile sensor as claimed in claim 11, further comprising a protection layer, disposed on the first supporting layer by coating, and a material of the protection layer comprising insulation polymer material.

18. The tactile sensor as claimed in claim 1, wherein a thickness of the elastic dielectric layer ranges between 50 microns and 500 microns.

* * * * *